United States Patent [19]

Badicel et al.

[11] Patent Number: 4,494,903
[45] Date of Patent: Jan. 22, 1985

[54] METHOD OF SUPPLYING CONCRETE

[76] Inventors: Evelyn Badicel, 1160 St. Mathieu St., Apt. 1110, Montreal, Canada, H3H 2P4; Gunnar O. Porko, 420 Lazard St., Mount Royal, Canada, H3R 1P5

[21] Appl. No.: 385,447

[22] Filed: Jun. 7, 1982

[51] Int. Cl.³ .............................................. B65G 65/42
[52] U.S. Cl. ..................................... 414/376; 414/574
[58] Field of Search ............... 414/332, 373, 376, 573, 414/574

[56] References Cited

U.S. PATENT DOCUMENTS

| | | | |
|---|---|---|---|
| 1,822,530 | 9/1931 | Kind | 414/373 X |
| 2,310,592 | 2/1943 | Noble | 414/21 |
| 2,341,939 | 2/1944 | Miller | 414/373 X |
| 2,616,758 | 11/1952 | Meyers | 298/7 |
| 3,180,686 | 4/1965 | Swanson | 414/21 X |
| 3,378,152 | 4/1968 | Warner | 414/574 |
| 3,606,050 | 9/1971 | Silver | 414/574 |
| 3,994,404 | 11/1976 | Kisovec | 414/21 |
| 3,998,362 | 12/1976 | Lapierre et al. | 222/185 |

FOREIGN PATENT DOCUMENTS

| | | |
|---|---|---|
| 627617 | 9/1961 | Canada . |
| 636794 | 2/1962 | Canada . |
| 964827 | 3/1975 | Canada . |
| 977387 | 11/1975 | Canada . |
| 1087380 | 10/1980 | Canada . |
| 2021527 | 12/1979 | United Kingdom ................ 414/574 |

*Primary Examiner*—Robert J. Spar
*Assistant Examiner*—David A. Bucci

[57] ABSTRACT

This describes a method and an apparatus for supplying freshly made concrete. Containers having two compartments are used, one compartment for aggregate and a companion compartment for cement. The container compartments are loaded from the top and are emptied simultaneously or one after another through apertures at the bottom of each compartment opened and closed by manually or power operated gates. The top of the compartments is closed by covers which protect against humidity infiltration or humidity loss. The contents are discharged through the respective aperture onto a receiving conveyor which carries the contents into an adjacent mixer where they are mixed together with the specified amount of water and specified additives which are measured out and introduced by appropriate apparatus mounted on or near the mixer to make the eventual viscous concrete.

3 Claims, 8 Drawing Figures

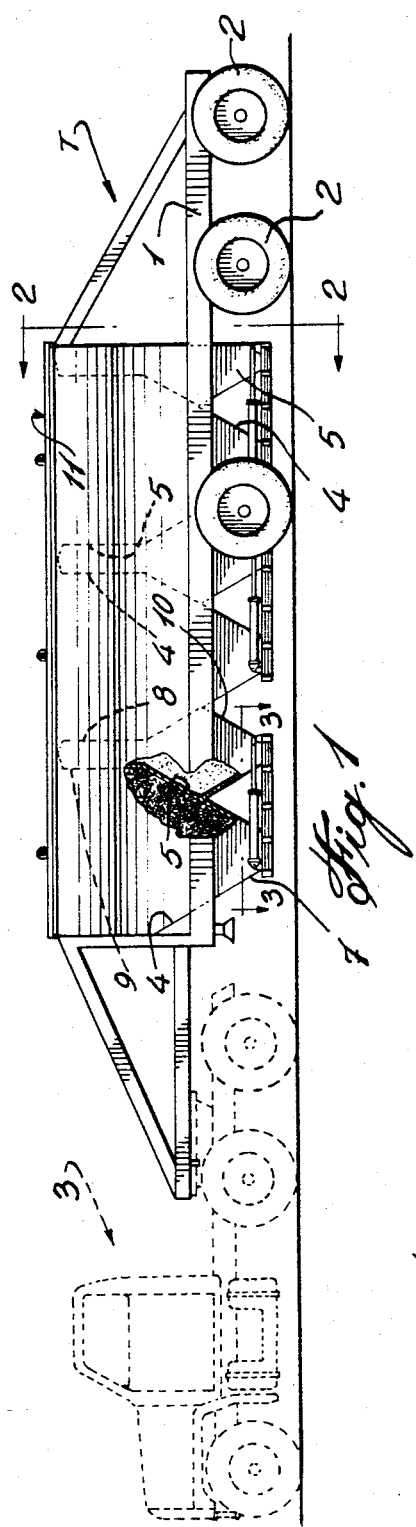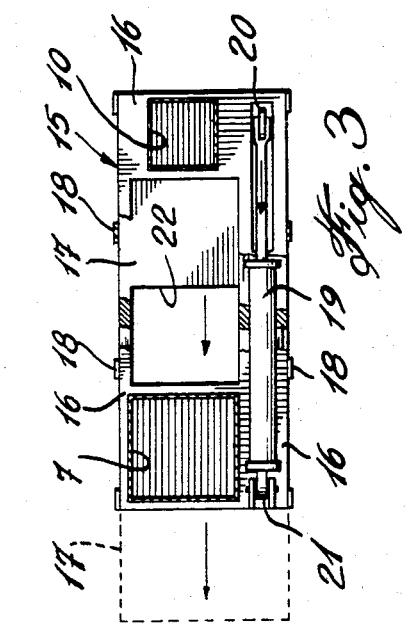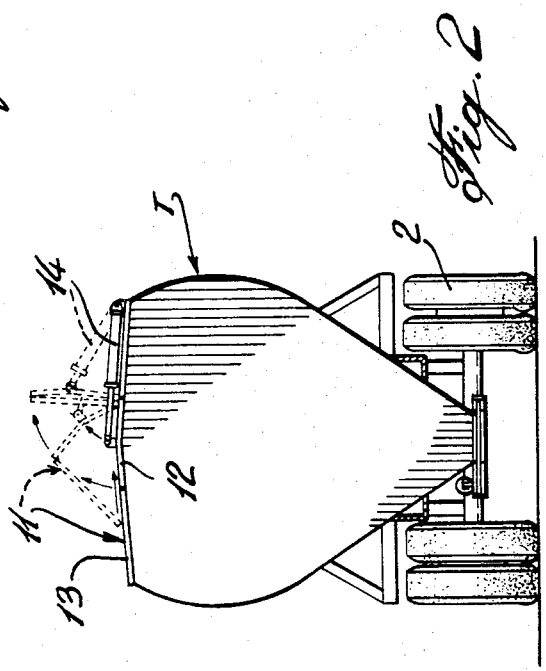

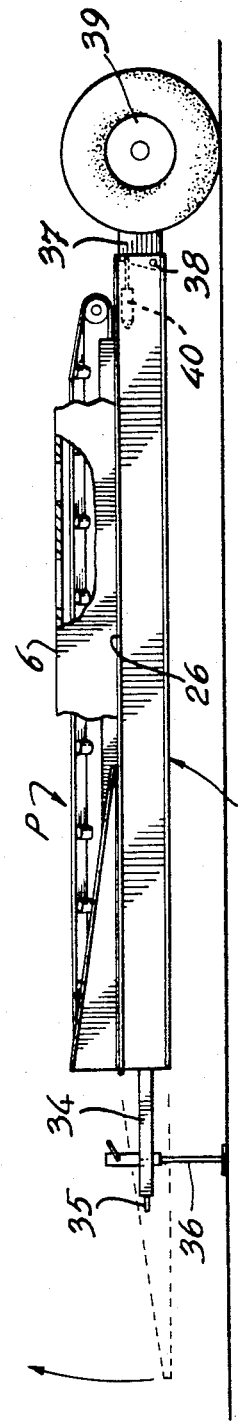
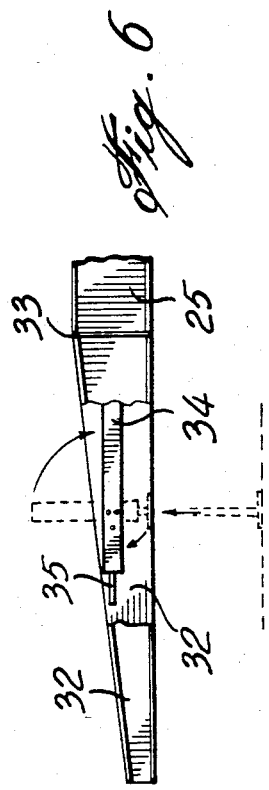
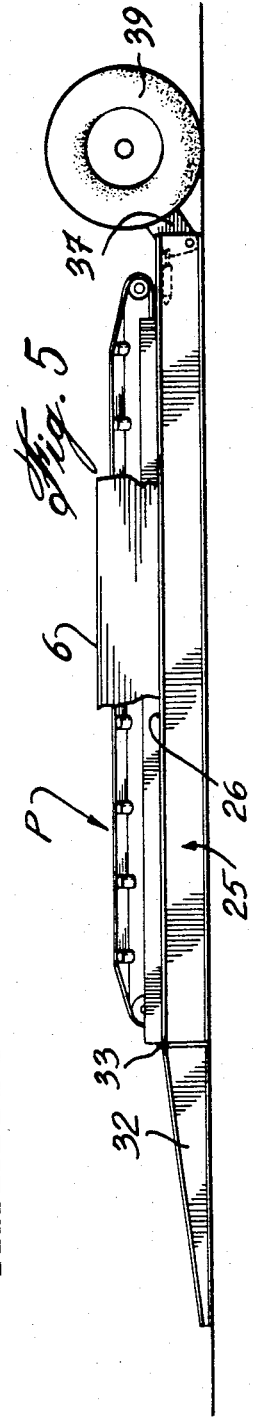

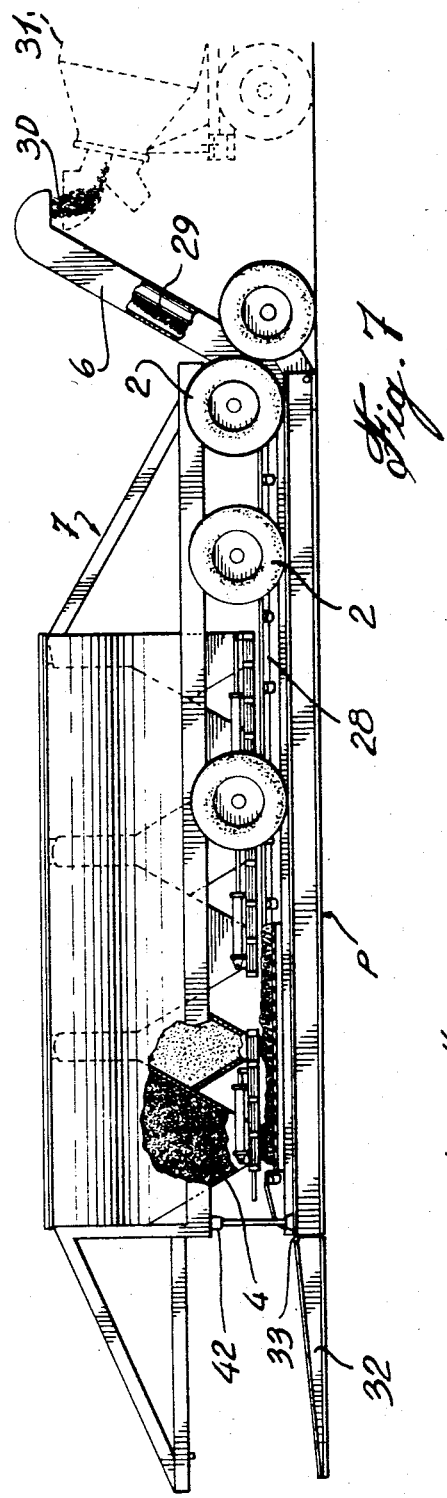

METHOD OF SUPPLYING CONCRETE

FIELD OF INVENTION

The present invention relates to a method and means for supplying freshly-made concrete.

BACKGROUND OF THE INVENTION

Concrete is generally supplied to a delivery site from a concrete batching plant located off the site, usually at the supplier's place of business. There, the required ingredients are weighed out and mixed, then loaded into a concrete mixer truck for delivery to the customer.

The ingredients are crushed stone and/or gravel, sand, cement, water and certain additives.

Immediately upon entering in contact, the cement and the water start a chemical reaction, the ultimate result of which is the hydration of the concrete, its "setting" or "hardening".

Because of this reaction, and to avoid segregation of the ingredients during transport, the concrete is agitated in a revolving mixer drum mounted on the truck, until discharged at the job site. A concrete truck is therefore a very costly piece of equipment.

Also because of the aforementioned reaction, this so called ready-mix concrete is the most perishable cargo carried in any quantity in modern urban traffic. Foodstuffs, ice, flowers etc. all last in good condition for more than 90 minutes, which is the generally accepted time limit for condemning a load of concrete.

As the average strength and quality of concrete keeps going up, so does the stringency of rules by which the owner's engineers try to protect that quality. What in bygone days was tolerated for the weaker mixes cannot be permitted for today's higher strength concretes. The sensitivity of future concretes to the requirements established for quality concrete can be predicted to increase not least in what concerns delivery time, already counted in minutes.

Meanwhile the conditions in which ready-mix concrete is delivered are becoming progressively worse. Traffic density increases, the number of stop signs and traffic lights constantly grows, routes on which truck traffic is allowed are progressively more restricted, limitations are legislated reducing vehicle loads, etc. None of these tendencies work in the concrete suppliers' favour.

On top of the above mentioned problems, the ready-mix concrete business in most areas suffers from a seasonal feast-and-famine pattern. While August to October the industry is hard pressed to find enough delivery capacity to satisfy the market, it has its yards full of idle equipment from January to March, due to the seasonal nature of its clients' business, in turn imposed by the climate.

Another weekly cycle superimposes itself on this annual cycle. Most construction sites so organize their work that placing of concrete is done on Thursdays and Fridays. This is so because thus the hydration process can take place over the weekend, on idle time. When the crews return on Monday morning, stripping of forms can be undertaken without any loss of working time, the setting of the concrete having occurred on Saturday and Sunday. Therefore, even in the busy seaason, ready-mix suppliers find themselves saddled with idle equipment and underutilized batch plants on Mondays, Tuesdays and Wednesdays, while the next two days see heavy overtime costs incurred.

The industry thus finds itself in a situation, where a cheap product (value just over 1¢/lb), is transported in very expensive and complicated equipment in conditions which render it rather precarious to meet delivery times imposed by the extreme perishability of the product. The large investment in equipment is in full use only two days a week under 3 or 4 months of the year and must thus be amortized over a few annual hours only. Obviously, some place along the road this industry either took a wrong turn, or more likely, failed to make a turn it should have.

U.S. Pat. No. 3,180,686, of 1965, has proposed rendering the concrete product non-perishable by not adding water to it until the time of its use at the terminal site. In this Patent, a trailer truck transports the aggregate in one compartment and cement in another compartment to the delivery site, where the ingredients are discharged onto a conveyor which feeds the dry material to a concrete mixer where water is added. However, in this Patent, the dry aggregate is exposed to the elements and to humidity infiltration or evaporation during transport so that there are no means to ascertain the degree of its humidity when arriving at the construction site and therefore it is impossible to calculate the exact amount of water to be added in the concrete mixer for obtaining the specified hydration and strength of the concrete. Furthermore the patent requires that the cement compartment have its discharge opening situated above that of the aggregate compartment, thereby restricting the flow of the aggregate.

OBJECTS OF THE INVENTION

It is the general object of the present invention to render the concrete materials being delivered non-perishable by providing a method and means of delivery of cement and other companion concrete ingredients to a delivery site without the required water added and mixing these ingredients at such site with the precisely specified quantity of water and additives required to obtain concrete of optimum specified quality and characteristics.

Another object of the present invention is to provide equipment of simpler and less expensive construction for the transportation of concrete ingredients and for delivering the same to a mixer at the indicated destination. Still another objective, through rendering the load non-perishable and transportable at a convenient time without regard to perishability, in less expensive equipment than that used in conventional methods, is to reduce the cost of concrete delivery.

A further objective is to improve the quality of the concrete by delivering it to the site of placing as fresh as possible.

Still a further objective is to render the supply of concrete flexible enough to accommodate changes in the placing schedule, occasioned by weather, accidents or any other reason.

SUMMARY OF THE INVENTION

The method of the invention consists of individually weighing required amounts of aggregate in its existing state of humidity and a proportionate amount of cement at the batching plant, measuring the humidity content of the aggregate at said plant, loading the aggregate into one compartment and the cement into another compartment of a container, transporting the container to the delivery site, discharging the ingredients from the respective compartments into a concrete mixer at the delivery site and adding the specified quantity of water and additives to said ingredients in the mixer, mixing the ingredients and discharging the fresh concrete into concrete placement means, and protecting the ingredients against humidity infiltration or evaporation from the time the humidity measurement has been effected at the batching plant to the time the ingredients have been loaded into the mixer so that the exact amount of water and additives may be added to the mix in said mixer. Preferably the means of transportation is a trailer truck built to comprise one or more individual containers. Each container has two compartments each provided with a discharge aperture at the bottom. All the discharge apertures are in longitudinal alignment parallel to the trailer centerline. Appropriate gate means are provided to close and open the two compartments of each container and closure means or hatches cover the tops of the compartments to protect the contents against precipitation and also to prevent humidity evaporation during transport and storage.

A mobile platform is also provided, this platform being preferably equipped with ground engaging sheels which are retractable to allow the platform to be lowered onto the ground. The platform provides two tracks for guided positioning the trailer onto the platform and is provided with a centrally located weatherproof conveyor means to receive the material discharged from the compartments and discharge the same into a mixer at the delivery site.

BRIEF DESCRIPTION OF THE DRAWINGS

In the annexed drawings:

FIG. 1 is a side elevation of the trailer truck for transporting the dry ingredients from the batching plant to the delivery site:

FIG. 2 is a cross-section taken along line 2—2 of FIG. 1;

FIG. 3 is a plan section taken along line 3—3 of FIG. 1;

FIG. 4 is a side elevation of a positioning platform shown in elevated position ready to be towed by a hauling vehicle;

FIG. 5 is a side elevation of the platform in lowered ground-engaging position ready to receive the truck trailer of FIG. 1;

FIG. 6 is a partial side elevation of the ramps in operative position and partially cut away to show the tow bar;

FIG. 7 is a side elevation of the platform and of the truck trailer in discharging position over the same and also showing the elevating conveyor means, together with the concrete mixer truck shown in dotted line; and FIG. 8 is a rear end view of the arrangement of FIG. 7.

In the drawings, like reference characters indicate like elements throughout.

DETAILED DESCRIPTION OF THE INVENTION

The truck trailer T used for the transport of the dry concrete ingredients is shown in FIGS. 1, 2, 3 and 7. It comprises an elongated frame 1 carried by ground-engaging tire wheels 2. The number and spacing of the axles are arranged to comply with road regulations as to road loading. The front end of the frame 1 is adapted to be hitched to a truck tractor 3 by way of a so called fifth wheel apparatus. The trailer frame 1 carries one or more containers each divided into two compartments 4 and 5 and mounted on frame 1. Compartments 4 are designed to contain the sand and the gravel or other aggregate in their natural state while compartments 5 are adapted to contain cement in a quantity required to produce the quality of concrete required by the consumer. Compartments 5 are of smaller size than compartments 4. Each compartment 4 is open at the top for the loading of the same and has a funnel shaped lower portion terminated by a discharge aperture 7 and each cement compartment has a top loading opening normally closed by a sealing hatch 9. The lower portion of the cement compartment 5 may be wider than the top to facilitate loading the aggregate compartment and is also of funnel shape and has a discharge aperture 10. All the discharge apertures 7 and 10 are longitudinally aligned and disposed parallel to the centre line of the trailer T.

Compartments 4 have their top loading opening provided with a closure means to protect the contents against humidity infiltration or loss. In the embodiment shown, the closure is a cover 11 consisting of two mutually-hinged panels 12 and 13. Panel 12 is connected to an operating means, for instance a power cylinder 14 for opening the same. In the open position, panel 13 folds against the open panel 12, as shown in dotted line in FIG. 2.

The discharge apertures 7 and 10 of two associated compartments 4 and 5 of one group may be provided with a common gate closure, generally indicated at 15. A flange 16 surrounds the two apertures 7 and 10. A closure plate 17, of the same size as flange 16, is slidably supported against the underside of flange 16 by spaced straps 18 secured to the longitudinal edges of flange 16. An operating means, for instance a power cylinder 19 is connected at one end to the closure plate 17 at 20, and at the other end to bracket 21 secured flange 16. In the closed position of the plate 17, the two apertures are sealed close and the closure plate 17 registers with flange 16, as shown in FIG. 3. Upon operation of the power cylinder 19, the plate 17 is moved to the position shown in dotted line in FIG. 3, whereby its opening 22 comes in register with aperture 7 of the aggregate compartment 4 and the free edge of the plate 17 uncovers aperture 10 of the cement compartment 5.

FIGS. 4 and 6 show the portable platform P to be used in association with the truck trailer T for the conveying of the dry concrete components to the cement mixer at the construction site. This platform consists of a generally rectangular rigid frame 25 forming two laterally-spaced longitudinally-extending parallell tracks 26 for receiving the wheels 2 of the trailer T. These tracks are interconnected by cross-beams 27, which support a conveyor system, in the form of a conventional conveyor 28, which is disposed along the centerline of the platform. Conveyor 28 is enclosed by a casing 6 which has top loading openings adapted to register with the discharge apertures 7 and 10 of the compartments 4 and 5 when trailer T is properly positioned on platform P. Conveyor 28 has an upwardly inclined conveyor portion 29 at its rear end, also totally enclosed by casing 6 and which provides a discharge 30 at a level for loading the material into a regular concrete mixer indicated in dotted line at 31. The conveyor portion 29 is preferably foldable over the main conveyor portion 28 when not in use. As an alternative, a separate elevating conveyor may be used instead of conveyor portion 29.

The platform P is provided at its front end with two ramps 32 of triangular shape which are pivoted at 33 to the front end of the platform so as to be foldable over the platform as shown in FIG. 4 when the latter is not in use. These ramps are in alignment with the respective tracks 26.

A tow bar 34 is secured to the front end of the platform P and is provided with a hitching eye 35 to engage a hook of a towing vehicle. Tow bar 34 is disposed between the two ramps 32.

A retractable and adjustable supporting leg 36 is mounted on the tow bar to raise and lower the front end of the platform.

Arms 37 are pivoted at 38 to the rear end of each track 26. A ground-engaging wheel 39 is rotatably carried by the free end of each arm 37. Power cylinders 40 serve to lower and raise the wheels 39, so that the platform may be raised, as shown in FIG. 4, for transport on a road and lowered into ground-engaging position, as shown in FIG. 5, for receiving the truck trailer T, as shown in FIG. 7. The wheels 39 are in alignment with the respective tracks 26 of the trailer and serve as a positioning bumper for the rear wheels of the truck trailer T, so that the discharge apertures of the compartments 4 and 5 will be respectively aligned with the top openings in the casing 6 of the conveyor 28, so that the material from the compartments 4 and 5 will properly discharge onto said conveyor 28. Furthermore, the truck trailer is laterally positioned on the platform P by lateral guide rails 41 extending along the inner longitudinal side of the respective tracks 26, as shown in FIG. 8.

At the batching plant, the humidity content of the aggregate, normally sand and stone to be delivered by the truck trailer T to the delivery site, is first measured and recorded. The top closure 11 is open and all the compartments 4 are loaded with the required amount of aggregate. The hatches 9 are open and the cement compartments 5 are each loaded with the required amount of cement, as specified by the customer. The hatches 9 are closed and also the closures 11, and the trailer T is moved by road by means of the tractor 3 to the delivery site, in the neighborhood of which construction takes place. The loaded trailer T can be left standing at any convenient place, for instance along a street curb, its legs 42 supporting the same. The tractor 3 is therefore free to move an empty trailer T back to the batching plant for reloading.

Previously, the platform P had been hauled by a suitable tractor to the delivery site where the concrete is to be delivered. In practice, platform P will be lowered at a position adjacent where concrete placement means are installed. Platform P is lowered into ground-engaging position, as shown in FIG. 5, with its ramps 32 pivoted to rest on the ground. The conveyor portion 29 is raised into its operative position, as shown in FIG. 7, and the mixer truck 31 is backed up to receive the material discharged from the conveyor portion 29.

Another tractor, similar to tractor 3, and which is made available at the terminal site, is hitched to the loaded trailer T and backs up this trailer over the platform P, using the ramps 32. The trailer is moved back until it abuts the platform wheels 39, which act as a positioning bumper for the trailer. In this position, the trailer legs 42 are lowered to engage the platform and maintain the trailer level. The tractor can then be unhitched.

Operation of the conveyors 28 and 29 is started and the closure gate 17 of one container is open to discharge the contents of said container, namely its two compartments 4 and 5 simultaneously or consecutively onto the conveyor 28, 29, which discharges the material into the mixer 31. Each container is designed for one batch suited for the capacity of the mixer. In the mixer, the specified amount of water and additives are added and, after mixing for a specified time, the concrete is ready to be poured into placement means, such as buckets, adapted to be hoisted by a crane.

The trailer shown has three containers and is therefore capable of supplying three batches for the concrete mixer. Once the trailer T is empty, it is removed from the platform by the site tractor and placed at a suitable parking place ready to be hauled back to the batching plant. Another fully-loaded tractor can be immediately positioned onto the platform for its unloading.

It should be noted that the cement and aggregate are fully protected against humidity infiltration and losses from the time the concrete ingredients are loaded into the truck trailer at the batching plant to the time these ingredients are discharged into the mixer 31 at the delivery site. Therefore, since weight and humidity measurements of the sand and aggregate had been taken at the batching plant, the correct amount of water can be added into the mixer.

Since the cement and aggregate are contained in trailer T without water added, the trailer T can be left loaded at the delivery site for any amount of time and, therefore, the system provides highly flexible loading and unloading sequences. Yet freshly-mixed concrete is always available at the delivery site and at the required time.

The platform P and the waiting trailers T can be positioned, for instance, along a street curb should the construction site be in a city, and the trailers T on adjacent streets ready to be moved by the "jockeying" tractor on and off the platform P.

Trailers T can be used for the transport of sand and gravel from the sand and gravel pits to the batching plant.

Although the method and system have been described in conjunction with the concrete industry, it should be noted that the same method and system could be used for other applications where it is desirable or imperative to mix at the last moment two or more separate ingredients which are designed to chemically react with one another.

Also, although the containers with their two compartments have been shown as being mounted on a truck trailer, it is obvious that other means of transportation could be provided for such containers.

What we claimed is:

1. A mobile platform for positioning at a destination site a truck trailer carrying at least one compartmented container defining two bottom-discharging compartments adapted to carry aggregate in one compartment and cement in the other compartment, with both compartments having discharge apertures located along a line parallel to the centerline of the truck trailer, said platform including an elongated frame adapted to rest on the ground, defining a pair of lateral transversely-spaced longitudinally-extending tracks for receiving the wheels of the truck trailer and having a front and a rear end, a longitudinally-extending concrete ingredients conveying means disposed longitudinally of said platform between said tracks, said conveying means including a conveyor enclosed in a casing, said casing having spaced load-receiving apertures adapted to register with the discharge openings of said container compartments when said truck trailer is positioned on said platform, ramp means pivoted to the front end of said platform to permit said truck trailer to embark onto said platform, said ramp means movable between a ground-engaging position extending forwardly of said platform and a stored position folded backwardly over said platform, a towing arm secured to and extending forwardly from the front end of said platform for hitching the platform to a towing truck, ground-engaging wheels carried by the rear end of said platform and respectively aligned with said tracks, and power means to raise and lower the platform with respect to said wheels, whereby said platform, when raised, can be towed by a truck on a road, said ground-engaging wheels protruding upwardly from said tracks when said platform rests on the ground to act as positioning bumpers for the rear wheels of said truck trailer, thereby compelling the positioning of the container discharge openings immediately over the conveyor load-receiving apertures.

2. A mobile platform as defined in claim 1, further including lateral guides extending alongside the respective tracks for laterally guiding the wheels of the truck trailer.

3. A platform as defined in claim 1, wherein said conveying means include an elevating conveyor portion having an upper discharge end at a level to discharge the ingredients into a concrete mixer.

* * * * *